United States Patent [19]

Güttinger

[11] 4,373,238
[45] Feb. 15, 1983

[54] SUPPORT ELEMENT WITH FLEXIBLE HEAD PORTION

[75] Inventor: Heinz Güttinger, Winterthur, Switzerland

[73] Assignee: Escher Wyss Limited, Zurich, Switzerland

[21] Appl. No.: 237,493

[22] Filed: Feb. 23, 1981

[30] Foreign Application Priority Data

Feb. 29, 1980 [CH] Switzerland ............... 1610/80

[51] Int. Cl.³ .................................. B21B 31/32
[52] U.S. Cl. ........................ 29/116 AD; 29/113 AD
[58] Field of Search ................. 29/113 AD, 116 AD

[56] References Cited

U.S. PATENT DOCUMENTS 4,091,517 5/1978 Lehmann et al. ............ 29/116 AD
4,262,400 4/1981 Miesch ........................ 29/116 AD

FOREIGN PATENT DOCUMENTS 2558068 6/1977 Fed. Rep. of Germany ........ 29/116 AD

*Primary Examiner*—Neil Abrams
*Attorney, Agent, or Firm*—Robert A. Ostmann

[57] ABSTRACT

In a support element with a flexible or inclinable head portion which faces a surface which is to be supported, the head portion is able to adapt to any changes in shape or position in order to maintain a parallel gap between the surface and the head portion. In order to support the head portion towards the surface which is to be supported, at least one pressure chamber is provided which can be acted upon by a pressure medium so that the force produced by this action of pressure medium acts on the head portion in the direction stated. A measuring device is provided, for measuring the size of the gap between the head portion and the surface to be supported. The pressure in the pressure chamber is regulated as a function of the measured size of the gap.

12 Claims, 12 Drawing Figures

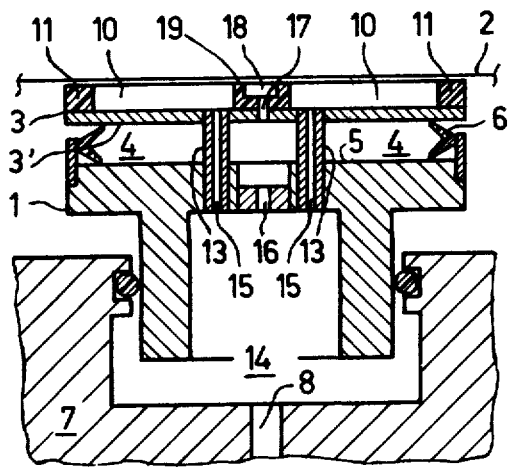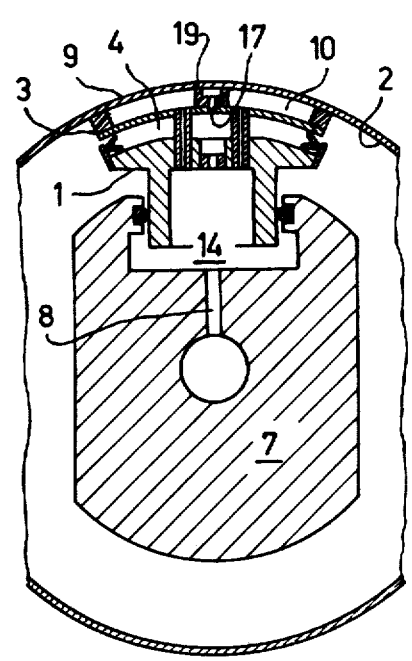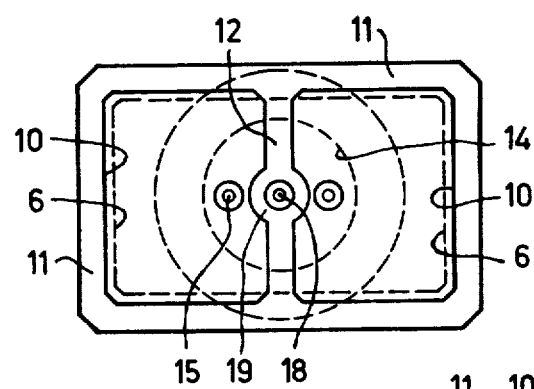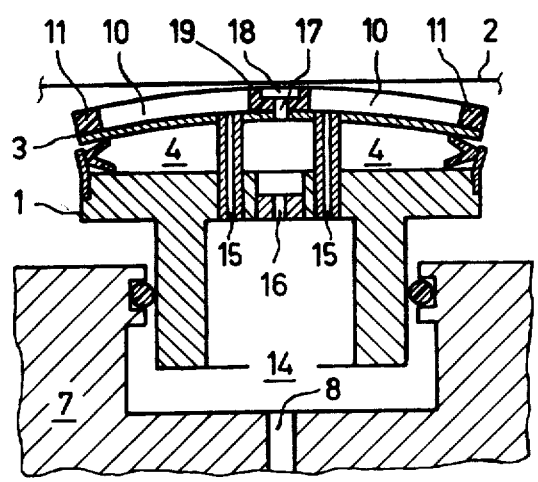

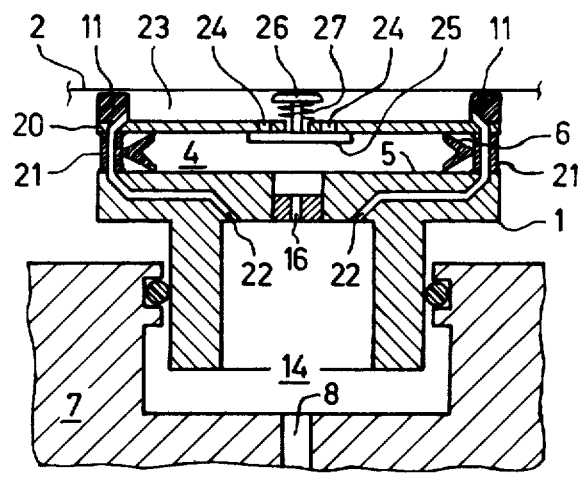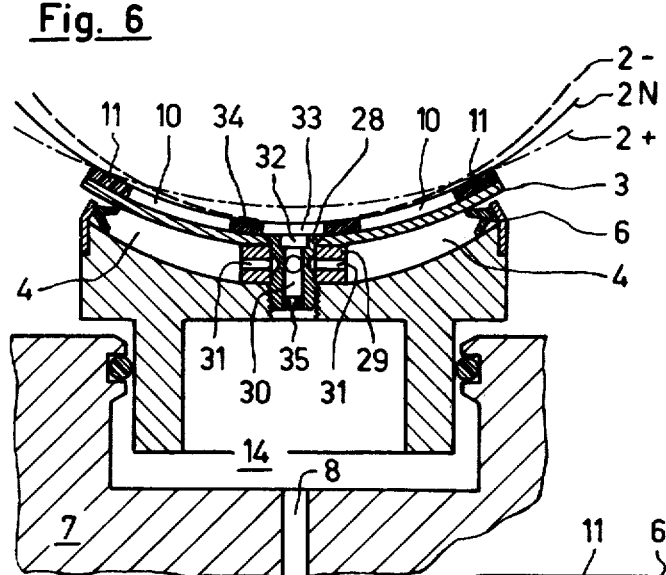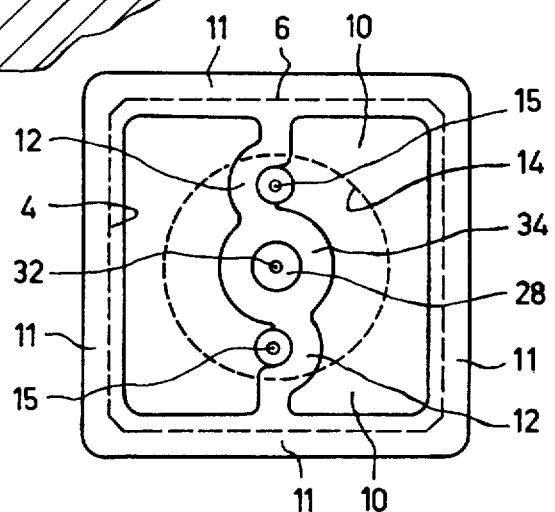

SUPPORT ELEMENT WITH FLEXIBLE HEAD PORTION

BACKGROUND OF THE INVENTION

The invention relates to a support element with a head portion facing a surface which is to be supported, the head portion adapting to any changes in the shape or position of the surface in order to maintain a parallel gap between the surface and the head portion, and for this reason being flexible or inclinable relative to the support element.

Support elements of this kind are advantageously used particularly in deflection-compensating rollers for treating a web of material, where the aim is to obtain a spacing between the cooperating rollers which is constant over the entire width of the web or to obtain a constant treatment pressure during deflection of the rollers by balancing out the deflection.

In deflection-compensating rollers, the support elements are arranged in a row along a fixed carrier, with a rotating roller shell also being provided.

In the case of elastic, e.g. elastomeric roller shells, in particular, deformation of the shell occurs under the operating pressure, with the result that a gap between the head portion of the support element and the surface of the shell which is to be supported is no longer parallel. Support is therefore obtained along a line or at individual points instead of along a surface.

To avoid this, support elements are known, for example from Swiss patent application No. 8351/78-7, or the corresponding U.S. application, Ser. No. 58,457, filed July 18, 1979, now U.S. Pat. No. 4,262,400, granted Apr. 21, 1981, which comprise a flexible, bridge-like head portion below which a space is left in the support element, and the flux of forces acting on the head portion in the direction of the surface which is to be supported is guided around this free space. Consequently, the head portion is able to adapt to changes in the shape or position of the surface of the supported, withing the scope of its flexibility.

Hitherto, it has only been possible to use the known support elements in a restricted compression range corresponding to the flexibility of the head portion. The idea of varying the flexibility of the head portion e.g. by means of additional elastic supports, has already been tried. However, even with this method, the flexibility of the head portion does not correspond exactly to the particular support pressure of the element which is applied or is to be applied.

SUMMARY OF THE INVENTION

The aim of the invention is to find a way of exactly matching the additional support required for the head portion to the support pressure of the support element applied or to be applied relative to the surface which is to be supported.

According to the invention, this aim is achieved, with the support element of the type described at the beginning, in that, to support the head portion in the direction of the surface to be supported, at least one pressure chamber capable of being acted upon by pressure medium is provided in such a way that the force produced by this action of the pressure medium acts on the head portion in the direction stated, the pressure in the pressure chamber being regulated as a function of the size of a gap located between the head portion and the surface which is to be supported, this size being measured by a measuring device.

As a result of the determining regulating value being measured, the pressure in the pressure chamber is adjusted to the level which ensures parallelism of the gap between the head portion and the surface which is to be supported. This can be automated and it is also possible to make the head portion itself very elastic so that the support element can be used over a wide compression range.

A particularly advantageous embodiment is obtained with a support element having hydrostatic pressure pockets on the head portion, which can be moved or pressed relative to the surface to be supported, by means of a hydraulic motor, if the motor, the pressure chamber, the measuring annular throttle point and the hydrostatic pressure pockets on the head portion are all acted upon by one and the same pressure medium.

BRIEF DESCRIPTION OF THE DRAWING

The object of the invention is further described and explained with reference to some embodiments shown in the accompanying drawings, wherein:

FIG. 1 is a cross sectional view of a support element in a deflection-compensating roller.

FIG. 2 is an enlargement of a portion of FIG. 1 showing the head of the support element parallel with the surface which is to be supported.

FIG. 3 is a plan view of the support element of FIGS. 1 and 2.

FIG. 4 is a view similar to FIG. 2, but showing the head inclined away from the surface to be supported.

FIGS. 5 and 6 are cross sectional views of two other embodiments.

FIG. 7 is a plan view of the support element of FIG. 6.

DESCRIPTION OF THE PREFERRED EMBODIMENT

Figure 8:
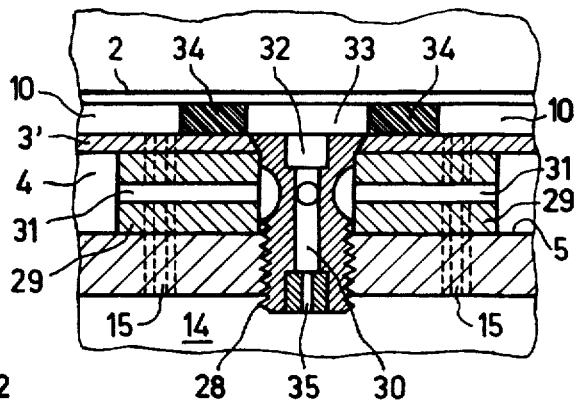
FIG. 8 is an enlarged view of the regulating device of FIG. 6.

The support element 1 comprises a head portion 3 facing a surface 2 which is to be supported, said surface being indicated by a line. The head portion 3 is formed by an elastic flexible plate 3' which is centrally supported by two studs 13, so that it adapts to the changes in shape or position by being deflected. It is also clear that the plate can also be inclined towards the support element.

For the purpose of supporting the head portion 3 in the direction of the surface 2 which is to be supported, a pressure chamber 4 is provided which is acted upon by a fluid under pressure. The pressure chamber 4 is bounded by the wall 3' of the head portion 3, by a wall 5 of the support element and by a seal 6, so that the force produced by the action of the pressure medium acts on the head portion 3 in the said direction towards the surface 2 which is to be supported. Thus, when sufficient pressure is built up in the pressure chamber 4, the head portion 3 bends towards the surface 2 which is to be supported, or vice versa, when the pressure in the pressure chamber 4 is broken down. According to the invention, the pressure in the pressure chamber 4 is regulated as a function of the size of the spacing measured between the head portion and the surface which is to be supported, i.e. when the measurement shows that the spacing is increasing in size this generates a signal for building up the pressure in the pressure chamber 4, and vice versa when it is found that the spacing is becoming smaller. In this way, the head portion 3 is constantly brought parallel to the supported surface.

The build-up and breakdown of pressure in the pressure chamber 4 can basically be obtained by regulating the inflow or outflow of pressure medium into or out of the pressure chamber 4 or by combinations of these possibilities. In the embodiments shown, the pressure is regulated by regulating the outflow whilst the inflow is kept constant.

The support elements shown are all hydrostatic support elements which are embedded like pistons in a fixed carrier 7, so that the element and the carrier form a motor 14, in this case a hydraulic motor, actuatable by pressure medium and supplied with a pressure fluid through a duct 8. A build-up of pressure in the motor moves the support element 1 relative to the surface 2 which is to be supported.

This can be seen particularly clearly in FIG. 1 which shows a cross section through a deflection-compensating roller. Around the fixed carrier 7 with the support elements 1 is a rotatable roller shell 9 the surface 2 of which in the region of the head portion 3 is to be supported against loading.

On the head portion 3 there are provided hydrostatic pressure pockets 10 facing the surface 2 which is to be supported, which are bounded by flexible walls 11 and a partition wall 12. The head portion 3 is secured to the support element 1 in positively locking manner by means of studs 13. The force generated in the hydraulic motor is transmitted to the head portion 3 via these studs 13. The hydrostatic pressure pockets 10 are acted upon by pressure fluid from the hydraulic motor 14 through ducts 15, through the studs 13. The pressure chamber 4, for supporting the head portion 3, is also acted upon by pressure fluid from the chamber of the motor 14, and this fluid is passed into said chamber 4 through a duct 16, through the wall 5. This inlet duct 16 is constantly open and thus permits the pressure fluid to flow constantly into the pressure chamber 4. An outflow duct 17 passes out of the pressure chamber 4 through the partition wall 12.

For measuring the spacing between the head portion 3 and the surface 2 which is to be supported, a measuring device is provided, comprising the outflow port 18 of the pressure duct 17 which conveys the pressure medium out of the pressure chamber 4. The outflow port 18 is oriented towards the surface 2 to be supported, so as to form an annular throttle gap 19 between the outflow port 18 and the surface 2 which is to be supported. This annular throttle gap constitutes a hydraulic odometer. The outflow resistance at the annular throttle point is the measured value by which the spacing of the head portion 3 from the surface 2 is measured. The value of this resistance is the signal or the regulating value for regulating the pressure in the pressure chamber 4. The greater the spacing of the surface 2 which is to be supported from the outflow port, the smaller the resistance encountered by the outflowing pressure fluid at the annular throttle gap 19, and the greater the outflow and hence the greater the drop in pressure in the pressure chamber 4; and vice versa. Thus, in this embodiment, the measuring function is integral with the regulating function.

This integrated method of operation is shown particularly well by FIGS. 2 and 4:

The support element 1 moves towards the surface 2 under the action of the force generated by the pressure in the hydraulic motor 14. The pressure fluid flows in throttled manner through the ducts 15,16 and out of the pressure chamber 4 through the duct 17, counter to atmospheric pressure only, into the surroundings of the support element. When there is no pressure in the pressure chamber 4 or in the pressure pockets 10, the head portion 3 has a predetermined convex shape. As the spacing of the head portion 3 from the surface decreases, the resistance at the annular throttle gap 19 increases, with the result that at the same time the outflow is also integrally regulated, i.e. throttled back, so that the pressure in the pressure chamber 4 is built up. In the immediate vicinity of the surface 2, the pressure in the pressure chamber 4 is so high that the flexible head portion deforms into the flattened shape shown in FIG. 2. At this moment, the walls 11 and 12 also reach the surface 2 and pressure is built up in the pressure pockets 10, caused by the inflow of pressure fluid through the ducts 15.

The head portion 3 is now parallel to the surface 2, and the entire support element is in a position of equilibrium between a film of fluid on the surface 2 which is to be supported and the pressure fluid in the motor 14, in accordance with the pressures prevailing in the pressure pockets 10 in the pressure chamber 4 and in the motor 14.

If the surface 2 to be supported is then deformed or if it moves away from the head portion 3 in any way, i.e. if the spacing between the head portion 3 and the surface 2 is increased at any point, the pressure in the pressure pockets 10 falls and the entire element moves towards the surface, under the effect of the pressure in the motor 14. As a result, the annular throttle gap 19 becomes smaller, the resistance increases, the outflow from the pressure chamber is regulated accordingly, i.e. throttled more. The pressure in the pressure chamber 4 rises and consequently the head portion is additionally pressed towards the surface 2, so that the walls 11 and 12 move nearer the surface 2, thus enabling the pressure in the pressure pockets 10 to build up again, and in this way the parallelism between the head portion 3 and the surface 2 is re-established. If for any reason the head portion 3 moves away from the surface 2, the gap of the annular throttle gap is enlarged, the pressure in the pressure chamber 4 is reduced as a result of a freer outflow of pressure fluid from the pressure chamber 4 and the head portion returns to its predetermined curved form shown in FIG. 4.

FIG. 5 shows a hydrostatic support element in which a head portion 20 is secured to the support element by means of two webs 21. The flexible head portion 20 can thus bend between the webs 21. A pressure chamber 4 is defined between the head portion 20 of the wall 5 and the surrounding seal 6. The supply ducts 22 pass from the motor 14 through the webs 21 into the hydrostatic pressure pocket 23. The pressure chamber 4 is supplied by the duct 16 from the motor 14. For the outflow of pressure fluid from the pressure chamber 4, ports 24 are provided, which lead into the pressure pocket 23. The regulating of the outflow is obtained by means of a valve plate 25 which covers the ports 24. For the purpose of measuring the spacing between the head portion 20 and the surface 2 which is to be supported, a sensor 26 is provided on the head portion and is mounted on the head portion 20 so as to be movable relative to the surface 2 which is to be supported. Thus, the sensor 26 projects more or less outwards relative to the head portion 20, depending on the spacing between the surface 2 to be supported and the head portion 20. Its position thus determined by the spacing of the head portion from the surface which is to be supported is the regulating value or the signal for regulating the outflow of pressure medium from the pressure chamber 4: If it projects more, the pressure in the pressure chamber 4 should increase, and vice versa. This sensor 26 is connected to the valve plate 25 which is provided for regulating the outflow from the pressure chamber 4 through the ports 24. Thus, again, an integrated component is provided, in which a measuring function is combined with a regulating function. If the spacing between the head portion and the surface 2 at the measuring point decreases, the sensor 26 and plate 25 are shifted and the plate 25 moves away from the ports 24. The outflow from the pressure chamber 4 is thus freed and the pressure falls at this point. If the spacing between the head portion 20 and the surface 2 is increased, the sensor and the valve plate are displaced under the pressure of a spring 27. In this way, the plate 25 closes the outflow ports 24, the pressure in the pressure chamber 4 builds up and the head portion becomes domed towards the surface.

The support element shown in FIGS. 6 and 7 shows an advantageous arrangement of a flexible head portion 3. In fact, when this head portion is curved, it is relatively rigid, along a plane which extends perpendicularly to the plane of the cross section shown, and is flexible in the plane of the section. Advantageously, the head portion 3 is centrally secured at its centre to the support element by means of a screw 28. The distance between the head portion 3 and the wall 5 of the support element is fixed in the centre of the pressure chamber 4 by a spacer ring 29.

Studs 13 are provided, aligned with the screw 28, along a line which extends perpendicularly to the plane of the cross section in FIG. 6, i.e. in the direction in which the head portion 3 is rigid when curved. Ducts 15 pass through the studs 13 and convey the pressure fluid from the motor 14 into the pressure pockets 10. Through the screw 28 there passes a channel 30 which is connected to the chamber of the motor 14. This channel 30 is connected to the pressure chamber 4 by bores 31 through the spacer ring 29. The channel 30 continues through the screw 28 with an outflow duct 32 which opens into a hydrostatic pressure pocket 33. The pressure pocket 33 is bounded by an annular wall 34 and is open towards the surface 2 which is to be supported. In this way there is formed, between the annular wall 34 and the surface 2, an annular gap which is an annular throttle point for the medium flowing out through the outflow duct 32 and the pressure pocket 33 connected in front of it.

The pressure fluid, throttled at the start of the channel 30 by means of a constriction 35 provided, flows to the pressure pocket 33, and the pressure chamber 4 is also supplied with pressure fluid through the bores 31 connected to said channel. At the same time, however, the bores 31 also constitute an outflow path for the pressure fluid from the pressure chamber 4, and this pressure fluid then flows away along the annular wall 34, through the profile of the continuation of the channel, namely the outflow duct 32, which is larger than the profile of the constriction 35. FIG. 6 shows the support element in a hydrostatically balanced position relative to the surface 2N to be supported, which has a predetermined normal form and is indicated by a solid line. This means that the head portion extends parallel to the surface 2N which is to be supported. In all the pressure chambers: in the motor 14, in the pressure chamber 4, in the pressure pockets 10 and in the pressure pocket 33, pressures prevail which are balanced with respect to one another, to achieve this. For example, in the motor 14 there is a pressure P, in the pressure chamber 4 a pressure $P \times 0.8$, in the pressure pocket 33 a pressure $P \times 0.8$ and in the pressure pockets 10 a pressure $P \times 0.6$. This is achieved by means of the throttle points at the constriction 35, at the ducts 15, along the annular wall 34 and along the surrounding wall 11.

If the surface to be supported becomes deformed so as to have a larger radius, as indicated by broken lines 2+ in FIG. 6, there is no pressure in the pressure chamber 4, the pressure pocket 33 or in the pressure pockets 10 at this moment, since they are open to the environment.

At this moment, the support element moves towards the surface 2+, deforming the head portion. At the same time, the walls 11 and the annular wall 34 move closer to the surface 2+, resistance is established, and in the pressure chamber 4, in the pressure pocket 33 and pressure pockets 10, the pressure which brings about the balanced hydrostatic position of the support element relative to the surface to be supported is created, as described above.

If the surface to be supported becomes deformed so as to take on a smaller radius, as shown in FIG. 6 by the broken line 2−, there is no pressure in the pressure pockets 10, since they are open to the atmosphere. The support element moves back, under the force of the motor 14, and greater resistance is established at the annular wall 34. A greater pressure is therefore built up in the pressure chamber 4, causing the walls 11 to move towards the surface 2−. The pressure pockets 10 are thereby closed off from the atmosphere and a pressure is established in them which produces the hydrostatically balanced position of the support element. The head portion 3 again extends parallel to the surface 2− which is to be supported.

FIG. 8 shows, on a larger scale, the above-mentioned integrated component for regulating the pressure in the pressure chamber 4 and for measuring the spacing between the surface to be supported and the head portion, as described above.

Figure 9:
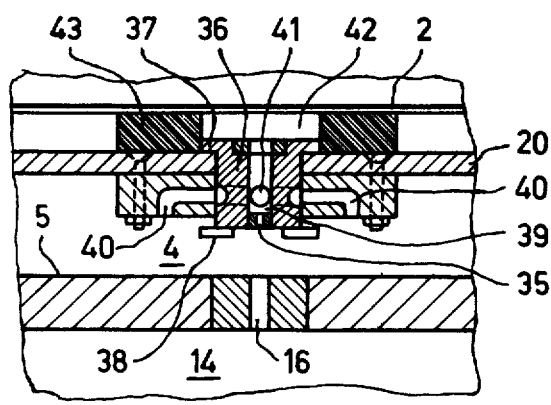
FIGS. 9 and 10 are cross sectional views of a further embodiment of the regulating device, showing that device in different positions.
Figure 10:
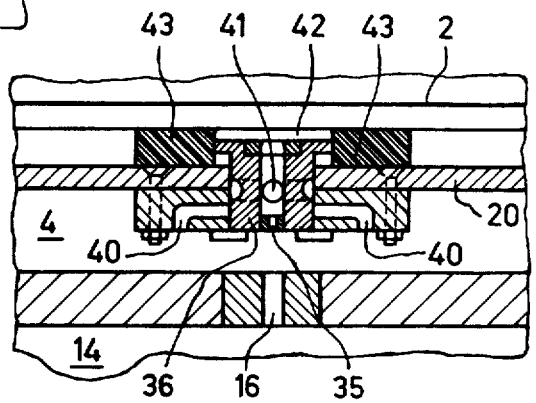
Figure 11:
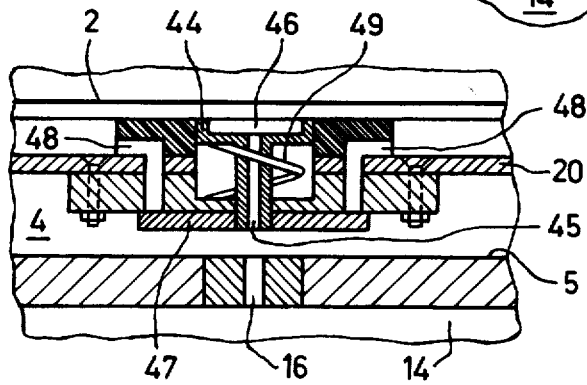
FIG. 11 is a cross sectional view of another form of regulating device.

FIGS. 9, 10 and 11 show integrated measuring and regulating components designed for a support element of the kind described with reference to FIG. 5:

The component in FIG. 9 comprises a roller-shaped sensor 36 displaceably guided in the head portion 20. Its movement is limited by a plate 37 and stops 38. It has a central channel 39 which leads out of the pressure chamber 4 and is provided with a constriction 35 at this end. The sensor 36 closes or opens outflow ducts 40 which are provided for the outflow of pressure fluid from the pressure chamber 4. For this purpose, the sensor 36 comprises bores 41 which lead into the channel 36 and, when they arrive in the region of the outflow ducts 40, enable the pressure fluid to flow out through the channel 39 into a pressure pocket 42. The pressure pocket 42 is bounded by the plate 37 and an annular wall 43 surrounding the latter and is open towards the surface 2 which is to be supported.

This component operates as follows: The pressure fluid flowing in from the motor 14 through the duct flows out of the pressure chamber 4 through the constriction 35 and passes through the channel 39 into the pressure pocket 42. When there is a reduced spacing between the surface 2 to be supported and the annular wall 43, a pressure is built up in the pressure pocket 42 which forces the sensor 36 into the position shown in FIG. 9 in which the bores 41 arrive in the region of the outflow ports 40 and the pressure in the pressure chamber 4 is reduced.

If the surface to be supported is at a greater spacing and the pressure in the pressure pocket 42 has fallen, the sensor 36 is pushed towards the surface to be supported, under the pressure in the pressure chamber 4, into the position shown in FIG. 10 in which the outflow ports 40 are closed. The pressure in the pressure chamber 4 builds up.

The sensor 44 in FIG. 11 has a throttle channel 45 which leads from the pressure chamber 4 into a pressure pocket 46. At the end nearest the pressure chamber 4, the sensor is connected to a plate 47 which covers outflow ports 48. If pressure is built up in the pressure pocket 46, the sensor 44 and plate 47 are pushed counter to the force of a spring 49, thus opening the outflow ports 48.

Figure 12:
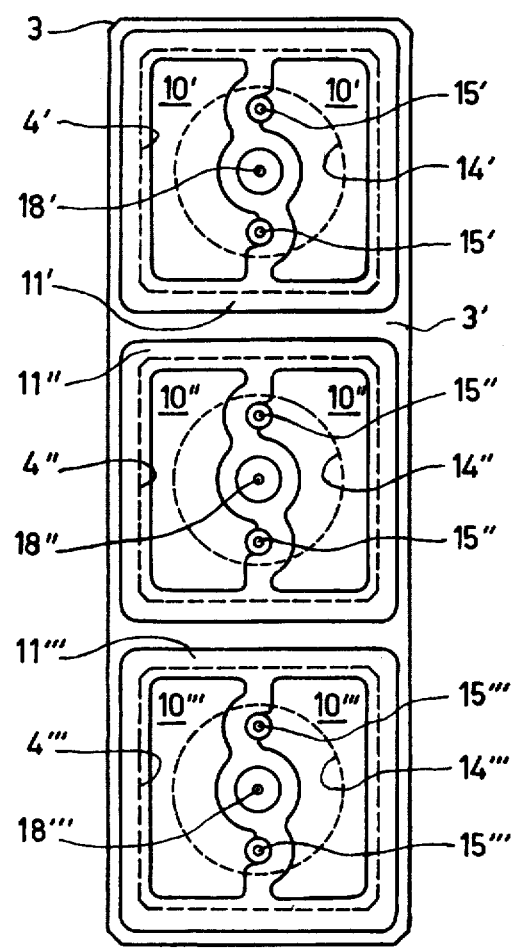
FIG. 12 is a plan view of an elongate head portion.

FIG. 12 shows a support element with the head portion 3 having an elongate outline viewed from above. Longitudinal portions are provided along its length. These coincide with regions of the pressure pockets 10′,10″ and 10‴. Each of the longitudinal portions comprises a measuring device and a regulating device 18′,18″ and 18‴, respectively, and a pressure chamber 4′ 4″ or 4‴, respectively associated with the latter and with the longitudinal portion and separated from the other pressure chambers. Thus, the particular spacing between the surface to be supported and the longitudinal portion of the head portion is measured separately in each longitudinal portion and the pressure in the associated pressure chamber is regulated accordingly. As shown here, a motor 14′,14″ or 14‴, respectively, is also provided in the region of each longitudinal portion. However, it is also possible to provide only one motor 14 for a number of longitudinal portions. For example, in the case of the support element shown here, a motor might be provided below the region of the pressure pockets 10″, centrally in relation to the support element and the head portion. In the example shown, an empty space is left free between the walls 11′, 11″, and 11‴ which bound the individual pressure pockets. However, it would also be possible for the walls to adjoin one another, or even for there to be only one pressure pocket extending longitudinally over some or all of the longitudinal portions.

The arrangement described above was envisaged particularly in terms of a so-called support strip, a support element with an elongate head portion the length of which corresponds to the entire length of, for example, a deflection-compensating roller.

I claim:

1. A support element for a movable member having a bearing surface of variable curvature, comprising a head including a flexible plate-like portion which, at one side, coacts with said surface of the movable member to define a bearing gap, and at its opposite side overlies a pressure chamber, the pressure in that chamber acting on the plate-like portion to deflect it toward the movable member; supply means for delivering fluid under pressure to the chamber; and control means responsive to changes in the width of said gap at a central region of the plate-like portion for controlling the magnitude of the pressure in the chamber, whereby the plate-like portion is flexed as required to remain parallel with said bearing surface in spite of changes in the curvature of that surface.

2. A support element as defined in claim 1 in which the supply means provides the chamber with a constant supply of fluid; and the control means comprises an outflow passage through which fluid discharges from the chamber, and flow control means for regulating flow through the outflow passage.

3. A support element as defined in claim 2 in which the control means comprising a sensor mounted on the head for movement toward and away from the bearing surface, whereby the position of the sensor changes with the width of the bearing gap; and wherein the flow control means regulates flow through the outflow passage in accordance with changes in the position of the sensor.

4. A support element as defined in claim 3 in which the sensor and flow control means are integral parts of a unitary valve which controls flow through the outflow passage.

5. A support element as defined in claim 2 in which the outflow passage leads from the chamber to an outflow port which faces the bearing surface; and the head and the bearing surface define an annular throttle gap which surrounds the outflow port and whose flow resistance varies with the spacing between the bearing surface and the head.

6. A support element as defined in claim 5 in which the annular throttle gap serves directly as the flow control means.

7. A support element as defined in claim 5 in which the flow control means comprises a throttling valve which controls flow through the outflow passage at a point between the chamber and the annular throttle gap; and means responsive to the backpressure created by the annular throttle gap for actuating the throttling valve.

8. A support element as defined in claim 5 in which the plate-like portion includes at least one hydrostatic bearing pocket which opens toward the bearing surface; and in which the outflow passage leads from the chamber to the bearing pocket through the annular throttle gap.

9. A support element as defined in claim 1 wherein the support element is mounted in a base for movement toward and away from the bearing surface; and which includes an hydraulic motor which urges the support element toward the bearing surface, hydrostatic bearing pockets which are formed on the plate-like portion and open toward the bearing surface, and additional supply means for delivering said fluid under pressure to both the hydraulic motor and the bearing pockets.

10. A support element as defined in claim 9 wherein said supply means includes a first throttled flow path leading from the hydraulic motor to the chamber; and said additional supply means includes a supply connection leading to the hydraulic motor, and second throttled flow paths separate from the first such path and leading from the hydraulic motor to the bearing pockets.

11. A support element as defined in claim 1 in which the head has a square outline.

12. A support element as defined in claim 1 in which the head has an elongate outline and comprises a plurality of discrete sections arranged end-to-end along its length, each section including its own said pressure chamber and said control means, whereby variations in curvature of the bearing surface along the length of the support element can be accommodated by independent flexing of the plate-like portions of the discrete sections.

* * * * *